United States Patent [19]

Gaither

[11] 4,436,134

[45] Mar. 13, 1984

[54] TIRE TOOL

[76] Inventor: Dolphard Gaither, Rte. 1, Box 43, Cameron, Okla. 74932

[21] Appl. No.: 324,620

[22] Filed: Nov. 24, 1981

[51] Int. Cl.³ ............................................ B60C 25/04
[52] U.S. Cl. ...................................... 157/1.3; 254/131
[58] Field of Search ................. 157/1.1, 1.3; 254/131, 254/131.5, 132

[56] References Cited

U.S. PATENT DOCUMENTS

| | | | |
|---|---|---|---|
| 965,858 | 8/1910 | Bellew | 157/1.3 X |
| 1,567,025 | 12/1925 | Allison | 157/1.3 |
| 2,112,661 | 3/1938 | Abrahams | 157/1.3 X |
| 3,168,285 | 2/1965 | Russac et al. | 254/131 |
| 3,680,838 | 8/1972 | Dunn | 254/131 |
| 3,823,756 | 7/1974 | Rainey | 157/1.3 |
| 4,126,297 | 11/1978 | Barnes | 254/131 |
| 4,360,052 | 11/1982 | Norris | 157/1.3 |

*Primary Examiner*—James G. Smith
*Attorney, Agent, or Firm*—Head, Johnson & Stevenson

[57] ABSTRACT

A tire tool for facilitating the removal of a tire from a wheel rim, and particularly a large diameter tire from its associated wheel rim, the tool having a substantially flat main body portion provided with an aperture in the proximity of one end and an arcuate flange at the opposite end, an arm member extending outwardly from the body in a direction away from the flange and at a planar angle with respect to the body, a plurality of first roller members journalled at the outer end of the arcuate flange for engagement with the inner wall of the tire during a tire removal operation, and a plurality of second roller members journalled at the outer end of the arm member for engagement with the wheel rim and moving axially there along during the tire removal operation, the bore being adapted for engagement by an elongated lever member for pivoting the tire tool in a direction for moving the second roller members axially along the wheel rim as the first roller members deform the tire for disengagement of the tire from the wheel rim.

12 Claims, 13 Drawing Figures

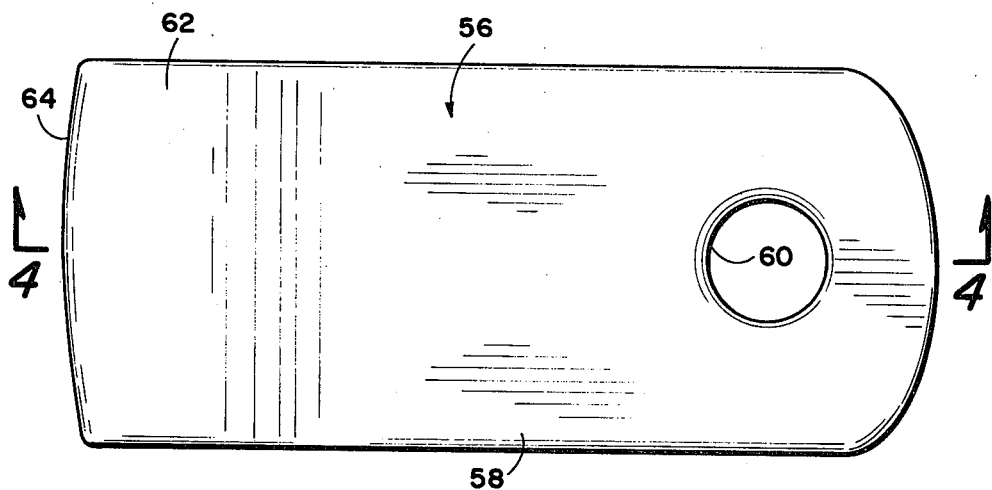
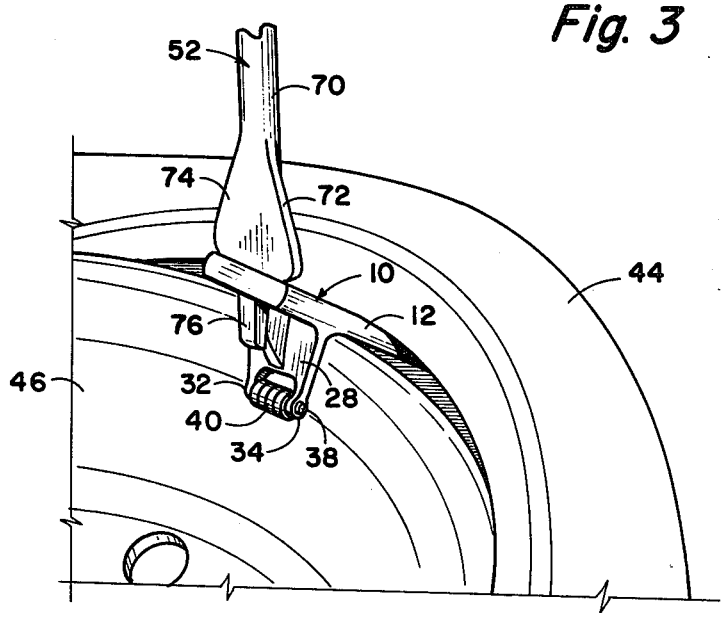

TIRE TOOL

BACKGROUND OF THE INVENTION

1. Field of the Invention

This invention relates to improvements in tire tools and more particularly, but not by way of limitation, to a tire tool for facilitating both the removal and installation of a large tire on a wheel rim.

2. Description of the Prior Art

The removal and installation of tires on wheel rims is a difficult and time consuming operation, particularly the removal and installation of large diameter tires such as found on large highway and off-highway vehicles. The usual passenger automobile tire is sufficiently small and light weight as to permit manually positioning thereof on an elevation, substantially horizontally disposed machine having a tool mounted thereon which may be utilized for breaking the seal between the tire and wheel rim. Once the seal has been broken between the bead of the tire and the wheel rim, the tool may be manually moved around the outer periphery of the tire bead for separating the tire from the wheel rim, and the application of suitable manual pressure against the loosened tire permits the removal of the tire from the wheel rim. Large truck tires, and the like, however, are heavy and unweildy and cannot be manipulated in this manner, and it frequently requires many hours of manual labor for the removal and installation of a single tire of this type. The disadvantages will be readily apparent.

Many tools have been developed for facilitating the removal and installation of tires from the associated wheel rims, such as the Threlfall U.S. Pat. No. 786,611; Hussey U.S. Pat. No. 834,908; Dickey et al. U.S. Pat. No. 1,587,634; Wendelken U.S. Pat. No. 2,615,507; Schultz et al. U.S. Pat. No. 3,029,860; and the McKinney U.S. Pat. No. 3,104,695. These tire tools, however, ride around the perimeter of tire and wheel rim and have not been found to be efficient or effective for the removal and installation of the large tires in widespread use today.

SUMMARY OF THE INVENTION

The present invention contemplates a novel tire tool which may be readily utilized for removal and installation of a large tire on a wheel rim in a matter of minutes, even by a person of relatively small stature and in some instances a tire may be removed in less than one minute. The novel tire tool comprises a substantially flat body having an arcuate flange at one end thereof and an aperture at the opposite end thereof. A plurality of rollers are journalled at the outer end of the arcuate flange for engagement with the inner sidewall of the tire. A substantially flat arm extends angularly outwardly from one face of the flat body, and is oppositely disposed with respect to the rollers of the arcuate flange. A plurality of similar rollers are provided or journalled at the outer end of the flat arm for engagement with the wheel rim. In some embodiments a bumper member or gusset is welded or otherwise secured between the flat body and flat arm. This bumper member is particularly desirable in the removal of camper vehicles tires.

In use, the tire tool is placed against the outer periphery of the wheel rim, with the flat arm being in engagement with the edge of the rim. Pressure is then applied against the body, such as by the foot of the operator, for forcing the rollers of the arcuate flange into a position between the tire bead and wheel rim. This is accomplished quite easily. When the tool has thus been installed with respect to the tire and wheel rim, any suitable lever, length of bar stock, or the like, may be engaged with the aperture provided in the outer end of the flat body. The lever or bar stock member is then pivoted about the connection point with the body and in a radially inward direction with respect to the wheel. This, in essence, ultimately places the lever or bar member substantially diametrically across the wheel. As the lever is initially pivoted in this radial direction, the rollers of the flat arm are moved into engagement with the inner periphery of the wheel rim, and a continued movement in this direction by the lever moves the rollers of the arcuate flange into engagement with the inner sidewall of the tire. The continued movement of the lever may be accomplished by the movement of the operator around the outer periphery of the wheel to a position substantially diametrically opposed with respect to the engagement of the tire tool with the tire and wheel rim in order to achieve the diametrically disposed position of the lever with respect to the wheel. This end position for the lever brings the arcuate flange into engagement with the inner sidewall of the tire instead of the rollers, and this lifts the bead of the tire completely away from the outer periphery of the wheel rim. The tire may then be easily manually moved axially along the outer periphery of the cylindrical portion of the wheel rim, whereupon the lever means may be utilized for completing the removal of the tire from the rim. It is to be noted that the rollers of the flat arm which engage the wheel rim move axially along the outer periphery of the wheel rim, as opposed to any movement around the circumference of the wheel rim. Of course, whereas substantially any length of bar stock may be utilized for the lever means, it is preferable that the tool be a length of pipe, or the like, having one end thereof particularly configured for engagement with the apertures of the flat body and for facilitating the complete removal of the tire from the wheel rim. Additionally, the lever means so configured may be utilized for facilitating the installation of the tire on the wheel rim. The novel tire tool and associated lever means are simple and efficient in operation and economical and durable in construction.

BRIEF DESCRIPTION OF THE DRAWINGS

FIG. 3 is a plan view of an auxiliary tool embodying the invention which may be utilized for facilitating the complete removal of a tire from a wheel rim.

FIG. 4 is a view taken on line 4—4 of FIG. 3.

FIG. 5 is a perspective view of a portion of a wheel rim and tire, with a tire tool embodying the invention disposed in an initial position with respect thereto for the removal of the tire from the wheel rim.

DETAILED DESCRIPTION OF THE PREFERRED EMBODIMENT

Figure 1:
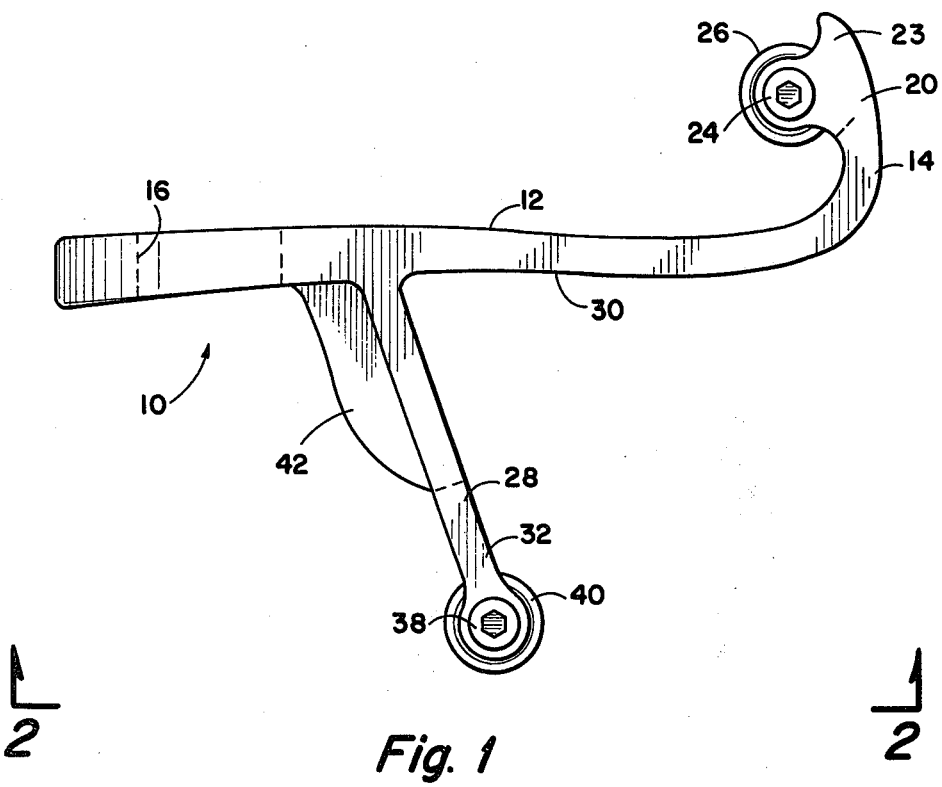
FIG. 1 is a side elevational view of a tire tool embodying the invention.
Figure 2:
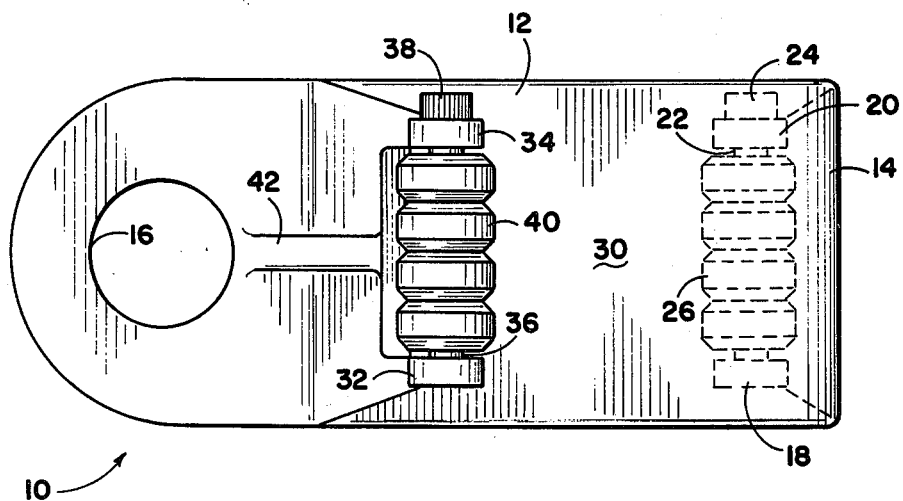
FIG. 2 is a view taken on line 2—2 of FIG. 1.

Referring to the drawings in detail, and particularly FIGS. 1 and 2, reference character 10 generally indicates a tire tool comprising a substantially flat main body portion 12 having an arcuate flange 14 provided at one end thereof and a bore or aperture 16 provided at the opposite end thereof. The flange 14 is preferably of a substantially reverse-curve configuration with respect to the plane of the body portion 12, and is provided with a pair of spaced, outwardly extending arcuate bracket members 18 and 20 at the outer end thereof each having an outwardly extending ear 23 (only one of which is shown). The brackets 18 and 20 are provided with aligned apertures (not shown) for receiving a shaft 22 therethrough which may be secured therebetween in any suitable manner, such as by a head member or lock nut 24, or the like. A plurality of in-line rollers 26 are journalled on the shaft 20 between the spaced brackets 18 and 20 for a purpose as will be hereinafter set forth.

A substantially flat arm member 28 extends outwardly from one face 30 of the body 12, said face 30 being oppositely disposed with respect to the arcuate flange 14, as particularly shown in FIG. 1. The arm 12 extends in an angular direction away from the bore 16, and is provided with a pair of spaced axially extending side bracket members 32 and 34 at the outer end thereof. The brackets 32 and 34 are provided with axially aligned bores (not shown) for receiving a shaft 36 therethrough, and the shaft 36 may be retained therebetween in any suitable manner, such as by a head member or lock nut 38, or the like, as is well known. A plurality of rollers 40 are journalled on the shaft 36 between the brackets 32 and 34 for a purpose as will be hereinafter set forth. In some instances, it may be desirable to interpose a bumper plate or gusset member 42 between the body 12 and the arm 28. The bumper 42 may be integral with the body 12 and arm 28, or may be welded or otherwise suitably secured therebetween, as desired.

Figure 6:
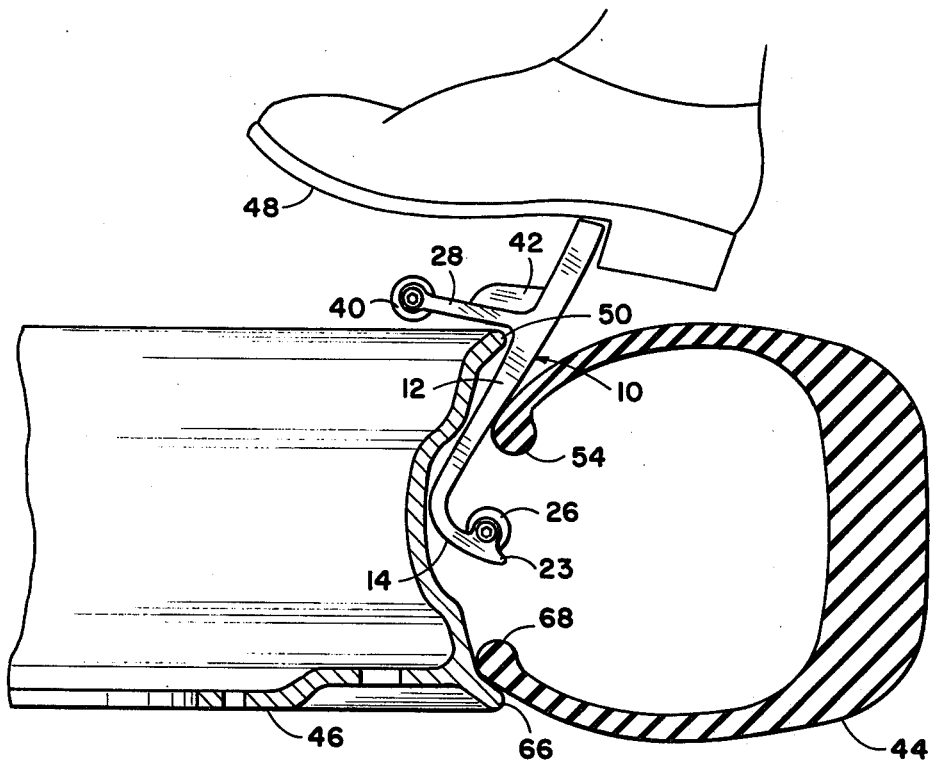
FIG. 6 is a sectional elevational view of a portion of a wheel rim and tire illustrating the initial step of use of a tire tool embodying the invention for removal of the tire from one side of the wheel rim.
Figure 7:
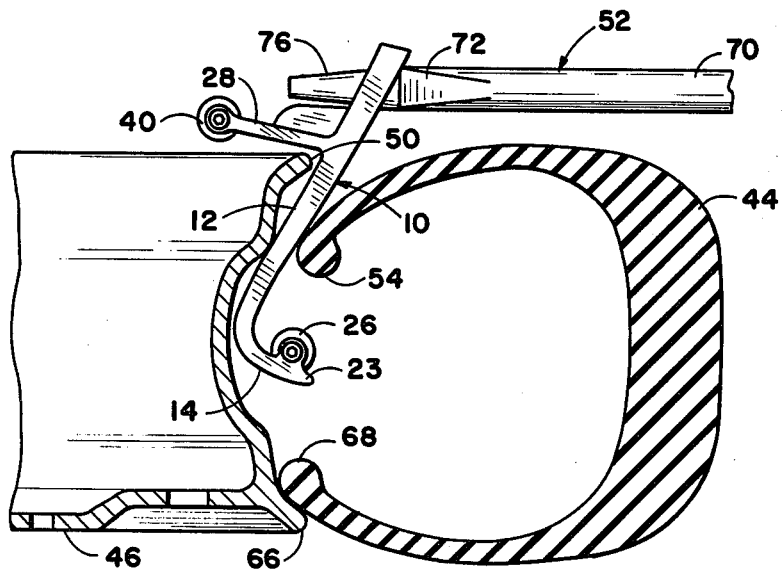
FIG. 7 is a view similar to FIG. 6 illustrating the next succeeding step in the removal of the tire with a tire tool embodying the invention.

Referring now to FIGS. 5 through 10, in order to use the tire tool 10 for the removal of a tire 44 from a wheel rim 46, the usual lubricating fluid may be applied around the inner periphery of the tire as is the usual practice, and the tool may be initially positioned with the arcuate flange 14 in the proximity of the juncture between the tire and the rim, and a sufficient pressure may be applied against the outer end of the body 12, such as by the foot 48 of an operator, for forcing the flange 14 between the tire and wheel and to the position shown in FIGS. 5 and 6. It will be apparent that the engagement of the arm 28 with the edge 50 of the wheel rim 46 will limit the depth of insertion of the body 12 between the tire and rim. Any suitable lever means, such as the elongated bar means 52, may be inserted through the exposed bore 16 of the body 12 as will be seen in FIGS. 5 and 7.

Figure 8:
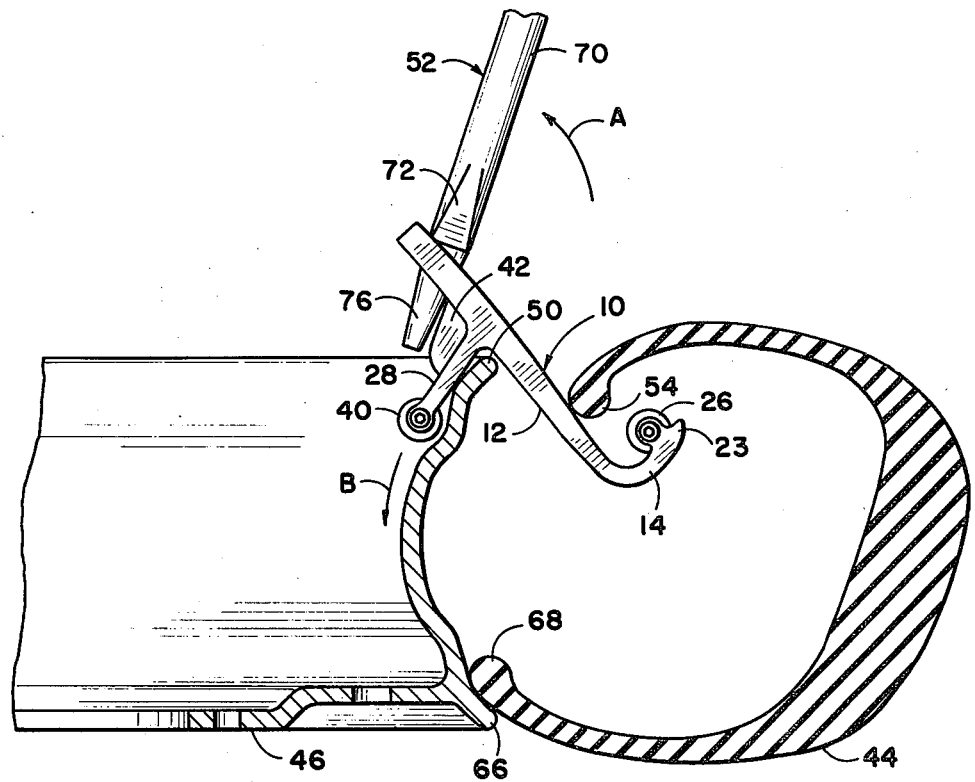
FIG. 8 is a view similar to FIGS. 6 and 7 showing the next succeeding step in the removal of the tire.
Figure 9:
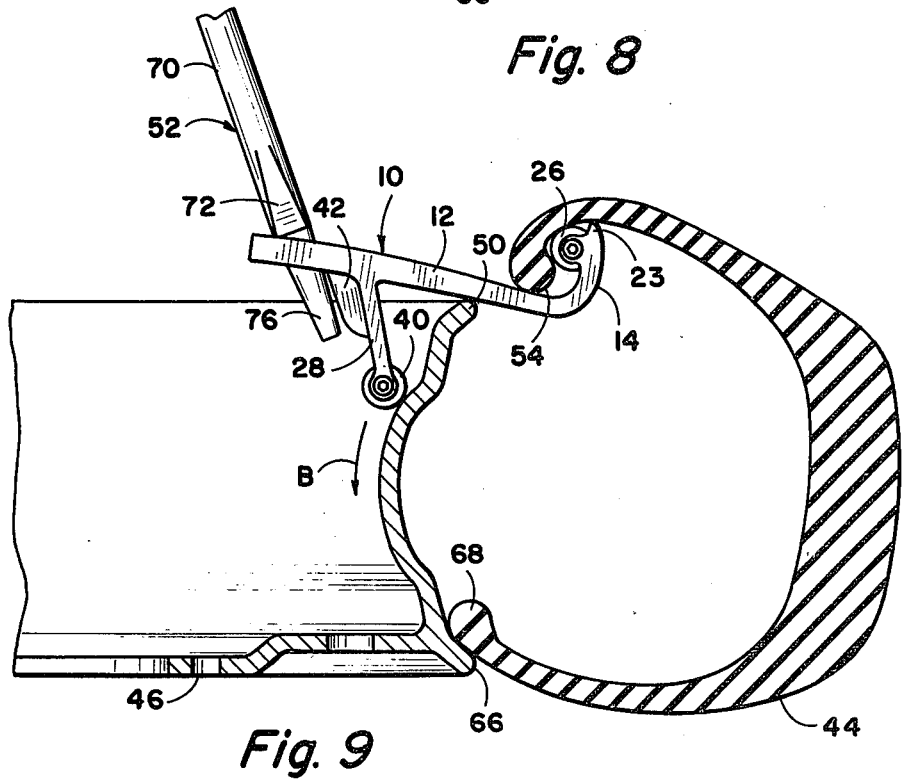
FIG. 9 is a view similar to FIGS. 6, 7 and 8 showing the next succeeding step in the removal of the tire.
Figure 10:
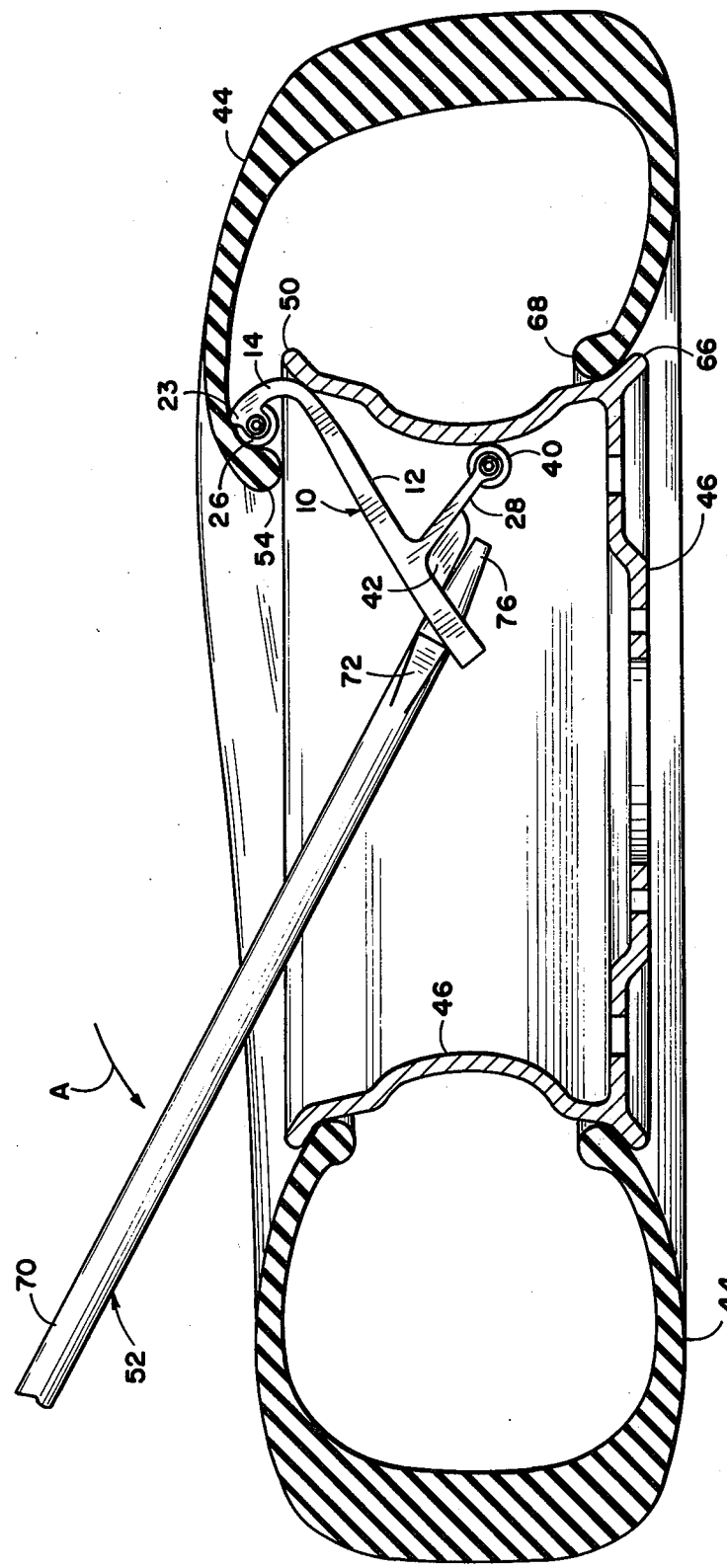
FIG. 10 is a sectional elevational view of a wheel rim and tire illustrating a still further step in the release of a tire from a wheel rim.

The lever means 52 is then manually pivoted about the connection with the bore 16 in the direction indicated by the arrows A in FIG. 8. This initial movement of the lever means 52 moves the rollers 40 of the arm 28 into engagement with the wheel rim 46. A continued movement of the lever means in this direction causes the rollers 40 to axially move along the wheel rim 46 in the direction indicated by the arrow B in FIGS. 8 and 9, bringing the rollers 26 into engagement with the interior sidewall of the tire 44. In order to continue to pivot the lever means 52 in the direction of the arrow A (FIGS. 8 and 10), the operator of the tool 10 may move or walk around the outer periphery of the tire 44 to a position substantially diametrically opposite the position of the tool 10, whereupon the lever means 52 may be moved to the position shown in FIG. 10. This places the lever means 52 substantially diametrically across the tire 44 and wheel rim 46, and moves the rollers 40 a further distance along the wheel rim 46.

As the lever means 52 is thus maneuvered, the rollers 26 move the bead 54 of the tire 44 progressively axially outwardly and radially inwardly with respect to the wheel rim 46, as shown in the drawings, with the final position of the bead 54 being completely released from engagement with the wheel rim 46 and disposed radially inwardly with respect thereto. In the final relationship between the tool 10 and tire 44, the ears 23 actually moves into engagement with the inner sidewall of the tire instead of the rollers 26. This releases the engagement of the entire bead 54 with the wheel rim 46, and the tire 44 may be readily manually moved into the position in the proximity of the opposite end of the wheel rim 46, as shown in FIGS. 11 and 12.

In order to release the tire from the opposite end of the wheel rim, the lever means 52 may be utilized, if desired. However, it may be desirable to complete the tire removal operation by using a helper generally indicated at 56 in FIGS. 3 and 4. The helper 56 comprises a body member or plate 58 having a slightly arcuate cross-sectional configuration, with a bore 60 similar to the bore 16 provided in the proximity of one end thereof. The sidewalls of the bore 60 may be somewhat convex, if desired, as particularly shown in FIG. 4, but not limited thereto. The opposite end of the plate 58 is provided with an arcuate flange 62 of a substantially reversing curve configuration, with the thickness thereof decreasing in the direction toward the outer end 64 thereof.

Figure 11:
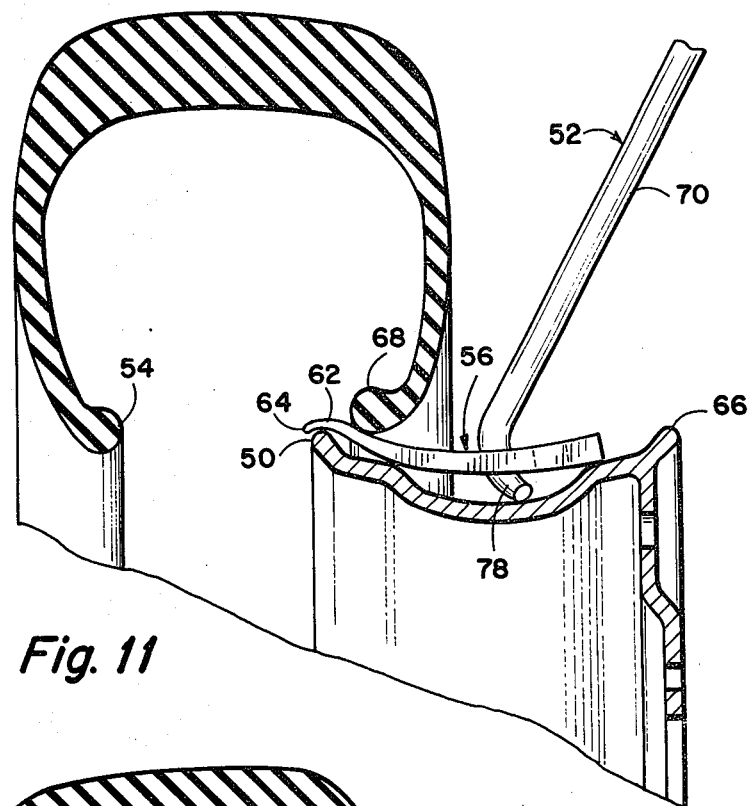
FIG. 11 is a sectional elevational view of a portion of a wheel rim and tire and illustrates a step in the removal of the tire from the second side of the wheel rim.
Figure 12:
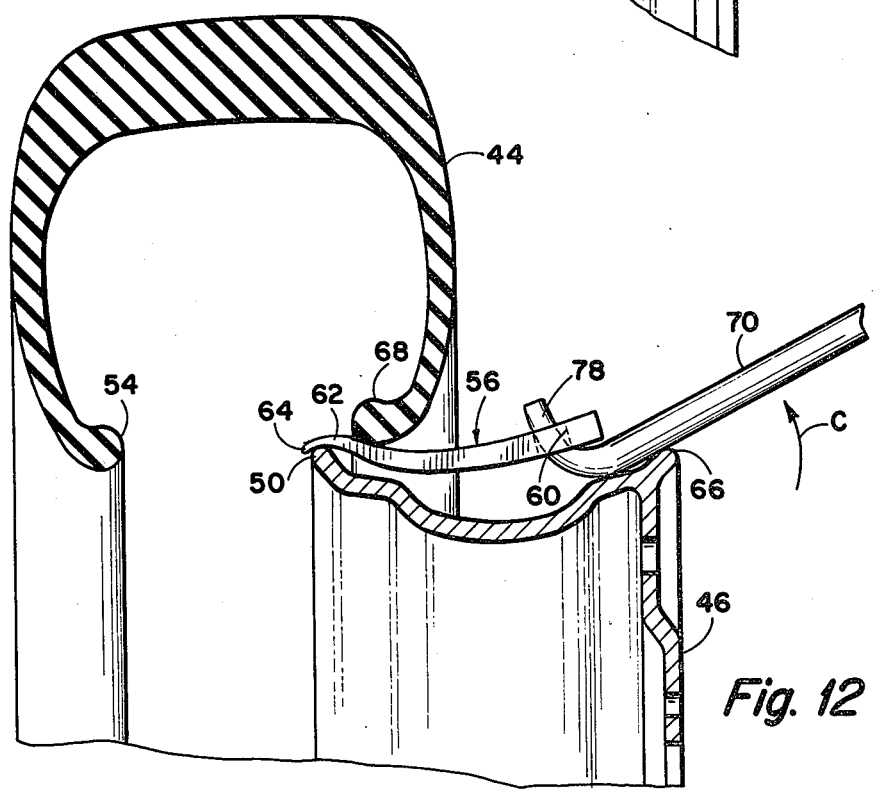
FIG. 12 is a view similar to FIG. 11 and shows the next succeeding step in the complete removal of the tire from the wheel rim.
Figure 13:
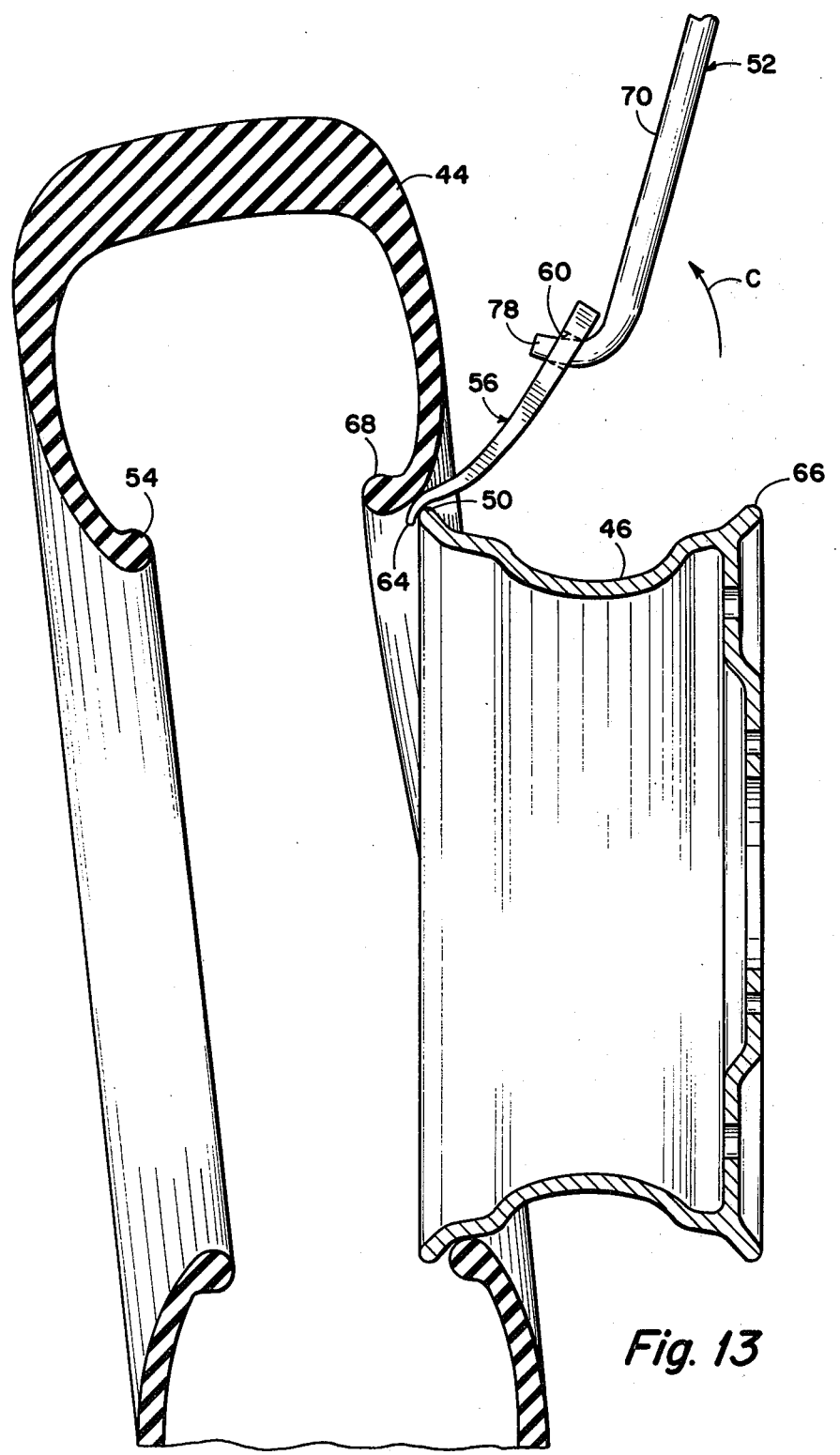
FIG. 13 is a sectional elevational view of a wheel rim and tire and illustrates the final step in the removal of a tire from a wheel rim by the use of a tire tool embodying the invention.

As shown in FIGS. 11, 12 and 13, the flange 62 may be inserted between the wheel rim 46 and the tire 44, with the outer end 64 thereof "hooked over" or engaged with the edge 50 of the wheel rim. The lever means 52 (which will hereinafter be described in detail) may be inserted between the body 58 and the outer periphery of the wheel rim 46 in order to facilitate the insertion of the flange 62 between the rim and tire as shown in FIG. 11, and if required. When the helper 56 has then been installed, the lever means 52 may be engaged with the aperture 60, and placed in a wedging position between the body 58 and wheel rim 46 in a reverse manner with respect to the initial relative position thereof, and as shown in FIG. 12. The lever means 52 may then be moved in the direction indicated by the arrow C in FIGS. 12 and 13, whereupon the flange 62 easily moves the bead 68 of the tire 44 over and axially away from the edge 50 of the wheel rim 46. This action completely releases the engagement of the tire 44 with the wheel rim 46, and the tire may be manually lifted away from the wheel rim 46.

The entire operation for removal of the tire 44 from the wheel rim 46 may be accomplished in a time span of less than a minute, even when the tire is of an exceedingly large size. In addition, the tire may be removed from the wheel rim by a person of relatively small stature since the forces and pressures required for the operation of the tool 10 (and helper 56) are not great.

Referring now to the lever means 52, as hereinbefore set forth, substantially any elongated bar or rod member may be utilized in combination with the tool 10 for extracting the tire 44 from the wheel rim 46. However, it has been found that certain refinements in the construction of the lever means may facilitate the operation of the tool 10. As shown herein, and particularly in FIGS. 5, 7, 8, 9 and 10, the lever means 52 may comprise an elongated bar or pipe 70 having one end thereof flattened to provide a pair of oppositely disposed outwardly extending flanges 72 and 74. The outer end of the flanges 72 and 74 converge and terminate in an axially extending prong or finger member 76 adapted for engagement with the bore 16. The flanges 72 and 74 limit the depth of insertion of the prong 76 within and through the bore 16, and engage the body 12 of the tool 10 for manipulation thereof as hereinbefore set forth.

Whereas the prong 76 and flanges 72 and 74 may be utilized for the final removal of the tire from the edge 50 of the wheel rim 46, it may be desirable to provide an arcuate or curved hook means 78 at the opposite end of the bar 70. The hook means is particularly configured for engagement with the bore 60 in the event the helper 56 is utilized for the final removal of the tire 44 from the edge 50 of the wheel rim 46 as hereinbefore set forth.

The problem of installing the tire 44 on the rim 46 is not as great as the problem of tire removal. As a result, the tool 10 may not be required for the installation operation. It may be desirable to utilize the lever means 52 and particularly the prong 76 and flanges 72 and 74 for the installation of the tire on the wheel rim 46. The procedure for installation of the time is somewhat the reverse of the removal operation, and the bead 68 of the tire is preferably initially moved over the edge 50 of the wheel rim 46. This may be done by a prying action, with the prong 76 and flanges 72 and 74 being interposed between the edge 50 and bead 68 for lifting the bead 68 over the edge 50 and onto the central portion of the wheel rim 46. The tire 44 may be moved axially along the outer periphery of the wheel rim 46 for positioning the bead 68 in the proximity of the edge 66 of the rim 46, whereupon the bead 54 may be similarly pried over the edge 50 by means of the prong 76 and flanges 72 and 74. In this manner, the tire may be quickly and easily installed on the outer periphery of the wheel rim 46.

From the foregoing it will apparent that the present invention provides a novel tire tool for facilitating the removal of a tire from a wheel rim, and particularly for facilitating the removal of a large tire from its associate wheel rim. The novel tool comprises a substantially flat body having an arcuate flange at one end thereof and a bore provided at the opposite end thereof. An angular arm is secured to or integral with the body and extends outwardly therefrom in an opposite direction with respect to the arcuate flange. A first plurality of roller members are journaled at the outer end of the arcuate flange, and a second plurality of rollers are journaled at the outer end of the arm. The first rollers are adapted for engagement with the inner sidewall of the tire during the removal operation, and the second rollers are adapted for riding axially along the wheel rim during the removal operation. The tool is initially inserted between the tire and wheel rim, and is pivoted by means of a lever apparatus for moving the second rollers axially along the wheel rim as the first rollers roll along the inner sidewall of the tire for flexing or deforming of the tire in a manner whereby the tire may be removed from engagement with the associated outer edge of the wheel rim. This releases the engagement of one entire tire bead with the wheel rim, and the remaining removal of the tire therefrom may be readily accomplished by the use of the lever apparatus and/or a helper means.

Whereas the present invention has been described in particular relation to the drawings attached hereto, it should be understood that other and further modifications, apart from those shown or suggested herein may be made within the spirit and scope of this invention.

What is claimed is:

1. A tool kit comprising a tool for removal of a tire from a wheel rim, lever means, and helper means, said tire tool comprising a main body portion having a bore provided in the proximity of one end thereof, an arcuate flange provided at the opposite end thereof, a plurality of first roller members journalled at the outer end of the arcuate flange, an arm member extending outwardly from one face of the main body portion and in a direction opposite the arcuate flange, and a plurality of second rollers journalled at the outer end of the arm member.

2. A tool kit as set forth in claim 1 and including bumper means secured between the arm member and the main body portion.

3. A tool kit as set forth in claim 1 wherein the arcuate flange is of a substantially reverse curve configuration.

4. A tool kit as set forth in claim 3 and including a pair of spaced outwardly extending apertured brackets provided at the outer end of the arcuate flange, and shaft means secured through and between the brackets for supporting the first rollers thereon.

5. A tool kit as set forth in claim 1 wherein the arm member is angularly disposed with respect to the plane of the main body portion, said arm member extending in a direction away from the bore.

6. A tool kit as set forth in claim 5 and including a pair of spaced outwardly extending apertured brackets provided on the outer end of the arm member and, shaft means secured through and between the brackets for supporting the second rollers thereon.

7. A tool kit as set forth in claim 1 wherein the lever means is engageable with the bore for manipulation of the tire tool for the removal of the tire from the wheel rim.

8. A tool kit as set forth in claim 7 wherein the lever means comprises elongated rod means having flange and prong means provided at one end thereof for engagement with the main body portion to provide said manipulation of the tire tool.

9. A tool kit as set forth in claim 8 wherein the flange and prong means of the lever means comprises a pair of radially outwardly extending opposed flange members converging at one end, and a prong member extending axially outwardly from the convergence of the flange members.

10. A tool kit as set forth in claim 7 wherein the helper means has a bore therein for cooperation with the lever means for facilitating the installation of the tire on the wheel rim.

11. A tool kit as set forth in claim 10 wherein the helper means comprises a body having an arcuate longitudinal configuration with said bore provided in the proximity of one end thereof, and arcuate hook means provided at the opposite end thereof.

12. A tool kit as set forth in claim 11 wherein the thickness of the body of the helper means decreases in a direction toward the outer end of the arcuate hook means.

* * * * *